No. 803,127. PATENTED OCT. 31, 1905.
C. T. PALMER.
HOSE COUPLING.
APPLICATION FILED AUG. 11, 1904.
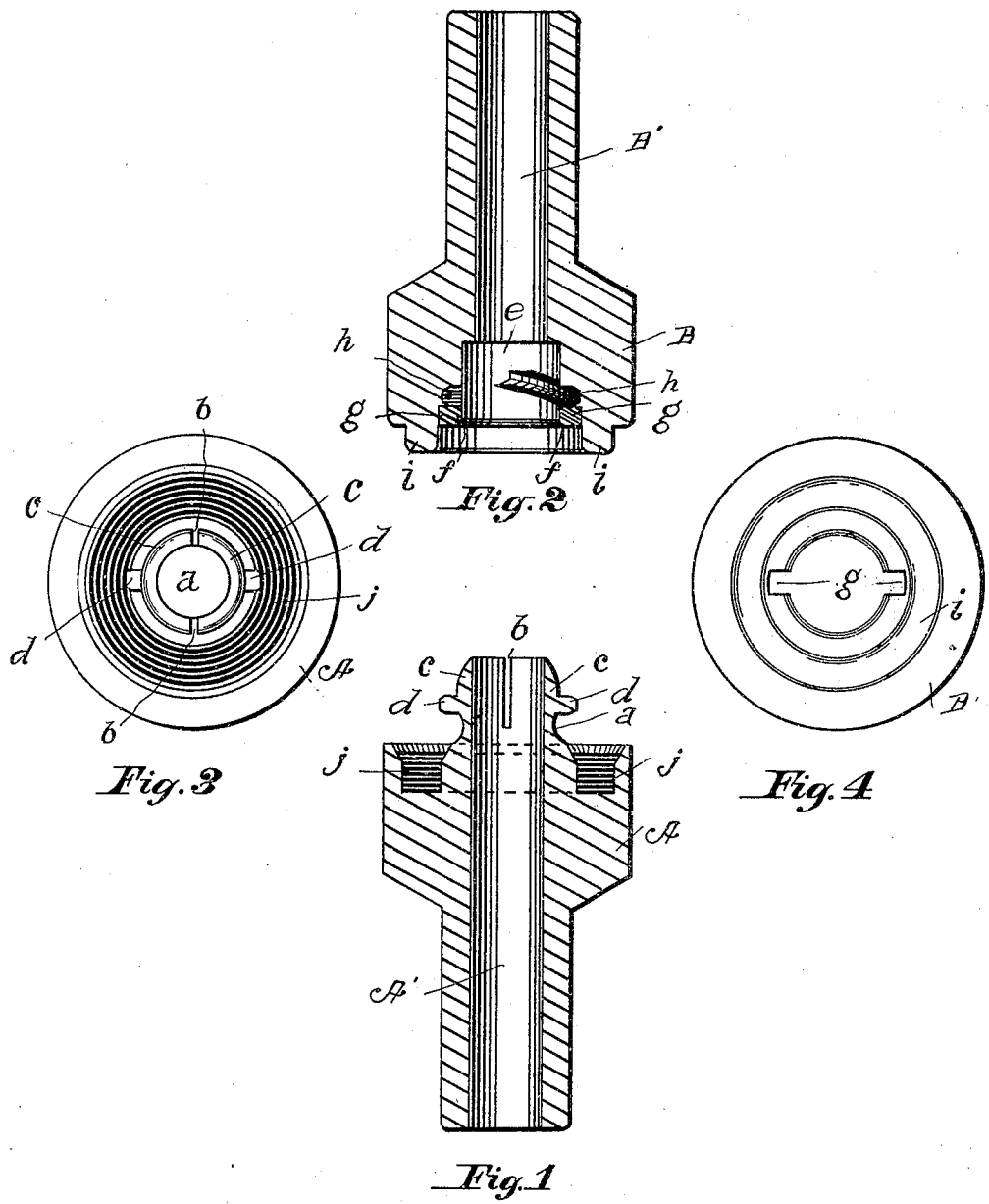
Witnesses:
D. S. Conger,
H. L. Clark
Inventor
Charles T. Palmer
per J. D. Clark
Attorney

UNITED STATES PATENT OFFICE.

CHARLES T. PALMER, OF CHICAGO, ILLINOIS.

HOSE-COUPLING.

No. 803,127.　　　　Specification of Letters Patent.　　　Patented Oct. 31, 1905.

Application filed August 11, 1904. Serial No. 220,385.

*To all whom it may concern:*

Be it known that I, CHARLES T. PALMER, a citizen of the United States, residing at Chicago, in the county of Cook and State of Illinois, have invented certain new and useful Improvements in Hose-Couplers, of which the following is a specification.

My invention relates to improvements in hose-couplers, and has for its object the provision of a device which will be easy of application and when the members of the coupling have been applied and connected with each other a rigid and tight joint will be formed. When connected, the members will be securely held together; but they may be disconnected with little difficulty by a simple manipulation.

With these objects in view the invention consists in certain novel features of construction, combinations, and arrangements of parts, as hereinafter described in the specification, particularly pointed out in the claim, and as illustrated in the accompanying drawings, in which—

Figure 1 is a vertical central sectional view of one member of the coupling. Fig. 2 is a vertical central sectional view of the member complementary to the member shown in Fig. 1. Fig. 3 is an end view of the section or member shown in Fig. 1, and Fig. 4 is an end view of the member shown in Fig. 2.

Referring to the drawings, the letters A and B designate the two members of the coupling, having the chambers or channels A' and B' therein. The hose to be connected together may be attached to the members A and B in usual and approved manner. The head of the member A is provided with a projecting disk or head $a$, in which are cut the slots or slits $b$, which extend from the upper edge or end of the head $a$ downwardly a suitable distance to allow of a spring action of the sides or walls $c$ of the head $a$ for a purpose to be described. Arranged diametrically on the opposite sides of the walls $c$ are the two lugs $d$, formed integral with the walls. These lugs are for the purpose of guiding the members of the coupling as they are brought together for connection when the head A is inserted in the channel $e$ of the receiving member B. The channel $e$ is somewhat smaller in diameter than the head $a$, so that when said head is brought into contact with the mouth of the channel $e$ the head is sprung in or compressed together as it enters the mouth of the channel or recess, the compression being permitted by the slots or slits $b$ in the head $a$. Slots $g$ $g$ are formed in the head and are of a sufficient size to permit the passage of the lugs $d$ on head $a$ of the section A. Within the channel $e$ of the section B is formed a spiral groove $h$, located adjacent the groove $g$ of said recess or channel.

The face or end of the section B is formed with an annular projection $i$, adapted to bear upon the rubber gasket $j$, located in a slot at the base of the head $a$ in member A.

To close the coupling, the members are brought together. The head $a$ is inserted in the open end C of the section B, the lugs $d$ passing through the grooves $g$ $g$, and in its passage walls $c$ of the head $a$ are compressed between the lugs $d$ and the grooves $g$. A continued pressure of the parts together brings the lugs $d$ $d$ in position to enter the spiral groove $h$, and by a turn of the sections A B in opposite directions the two members are locked firmly together by the engagement of the lugs in the spiral groove.

The pressure with which the annular flange or projection $i$ bears against rubber gasket $j$ insures a tight joint to prevent leakage of fluid as it passes through the couplings.

From the above description, taken in connection with the drawings, it will be obvious that I have produced a simple device which may be easily manipulated, will be simple in operation, compact and durable, and possessing the necessary requisites for a device of this character.

What I claim is—

In a hose-coupling, the combination with a male member having an annular recess or seat, a gasket in said seat, a central slotted compressible projection or head formed with integral lugs on its outside periphery, of a female member having an annular rim adapted to fit the annular seat of the male member, a channel in said female member adapted to receive and compress the head of the male member, slots in said female member to permit the passage of the lugs of the head, and a spiral groove within the channel adjacent said slots adapted to receive the lugs and form locking connection between the two members.

In testimony whereof I affix my signature in presence of two witnesses.

CHARLES T. PALMER.

Witnesses:
　C. C. CLARK,
　H. L. CLARK.